United States Patent
Agans et al.

(10) Patent No.: US 10,133,513 B1
(45) Date of Patent: Nov. 20, 2018

(54) CACHE MANAGEMENT SYSTEM AND METHOD

(71) Applicant: EMC CORPORATION, Hopkinton, MA (US)

(72) Inventors: David J. Agans, Wilton, NH (US); David W. Harvey, Newton Center, MA (US); Gregory S. Schaffer, Berlin, MA (US); Mark J. Cariddi, Merrimack, NH (US); Long Zhang, Beijing (CN); Henry Austin Spang, IV, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/821,388

(22) Filed: Aug. 7, 2015

(51) Int. Cl.
*G06F 12/00* (2006.01)
*G06F 3/06* (2006.01)

(52) U.S. Cl.
CPC .......... *G06F 3/0659* (2013.01); *G06F 3/0611* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 5,809,516 A * | 9/1998 | Ukai | ...................... | G06F 3/061 711/113 |
| 8,131,967 B2 * | 3/2012 | Lemke | ................ | G06F 13/4059 710/52 |
| 8,184,540 B1 * | 5/2012 | Perla | ..................... | H04L 47/568 370/235 |
| 2009/0172666 A1 * | 7/2009 | Yahalom | ............... | G06F 3/0605 718/1 |
| 2009/0182790 A1 * | 7/2009 | Hluchyj | ................ | G06F 3/0613 |
| 2015/0244804 A1 * | 8/2015 | Warfield | ............. | H04L 47/6295 709/219 |

* cited by examiner

*Primary Examiner* — David Yi
*Assistant Examiner* — Craig S Goldschmidt
(74) *Attorney, Agent, or Firm* — Brian J. Colandreo; Mark H. Whittenberger; Holland & Knight LLP

(57) ABSTRACT

A method, computer program product, and computing system for determining a queue depth and a flush rate for each of a plurality of pending data queues associated with a cache system, thus defining a queue depth/flush rate pair for each of the plurality of pending data queues. A predicted drain time is determined for each of the plurality of pending data queues based, at least in part, upon the queue depth/flush rate pair, thus defining a plurality of predicted drain times that are respectively associated with the plurality of pending data queues.

6 Claims, 4 Drawing Sheets

CACHE MANAGEMENT SYSTEM AND METHOD

TECHNICAL FIELD

This disclosure relates to cache management systems and, more particularly, to cache management system that regulate cache utilization amongst multiple hosts.

BACKGROUND

Storing and safeguarding electronic content is of paramount importance in modern business. Accordingly, large data storage systems may be utilized to protect such electronic content, wherein such large data storage systems may be configured as data storage arrays to provide a high level of data availability. Such large data storage systems may utilize cache memory systems to expedite the storage/retrieval of data within/from these data storage arrays by multiple hosts. Unfortunately and for various reasons, certain hosts may over-utilize such cache memory systems, resulting in a broad-based reduction in the performance of these data storage arrays.

SUMMARY OF DISCLOSURE

In one implementation, a computer-implemented method is executed on a computing device and includes determining a queue depth and a flush rate for each of a plurality of pending data queues associated with a cache system, thus defining a queue depth/flush rate pair for each of the plurality of pending data queues. A predicted drain time is determined for each of the plurality of pending data queues based, at least in part, upon the queue depth/flush rate pair, thus defining a plurality of predicted drain times that are respectively associated with the plurality of pending data queues.

One or more of the following features may be included. A storage array may include a plurality of volume groups and each of the plurality of pending data queues is associated with a respective volume group chosen from the plurality of volume groups. Each of the plurality of pending data queues may be configured to temporarily store data to be written to a respective volume group chosen from the plurality of volume groups. The plurality of predicted drain times may be compared to identify a high-utilization volume group, chosen from the plurality of volume groups, that is disproportionately utilizing the cache system. The rate at which data is allowed to enter a high-utilization pending data queue, included within the plurality of pending data queues and associated with the high-utilization volume group, may be regulated based, at least in part, upon the queue depth/flush rate pair defined for the high-utilization pending data queue. Regulating the rate at which data is allowed to enter the high-utilization pending data queue may include delaying the issuance of write acknowledgements to a host that is providing the data that is entering the high-utilization pending data queue. Regulating the rate at which data is allowed to enter the high-utilization pending data queue may include throttling the issuance of write acknowledgements to a host that is providing the data to the high-utilization pending data queue so that the rate at which data is entering the high-utilization pending data queue is equal to the rate at which data is leaving the high-utilization pending data queue.

In another implementation, a computer program product resides on a computer readable medium that has a plurality of instructions stored on it. When executed by a processor, the instructions cause the processor to perform operations including determining a queue depth and a flush rate for each of a plurality of pending data queues associated with a cache system, thus defining a queue depth/flush rate pair for each of the plurality of pending data queues. A predicted drain time is determined for each of the plurality of pending data queues based, at least in part, upon the queue depth/flush rate pair, thus defining a plurality of predicted drain times that are respectively associated with the plurality of pending data queues.

One or more of the following features may be included. A storage array may include a plurality of volume groups and each of the plurality of pending data queues is associated with a respective volume group chosen from the plurality of volume groups. Each of the plurality of pending data queues may be configured to temporarily store data to be written to a respective volume group chosen from the plurality of volume groups. The plurality of predicted drain times may be compared to identify a high-utilization volume group, chosen from the plurality of volume groups, that is disproportionately utilizing the cache system. The rate at which data is allowed to enter a high-utilization pending data queue, included within the plurality of pending data queues and associated with the high-utilization volume group, may be regulated based, at least in part, upon the queue depth/flush rate pair defined for the high-utilization pending data queue. Regulating the rate at which data is allowed to enter the high-utilization pending data queue may include delaying the issuance of write acknowledgements to a host that is providing the data that is entering the high-utilization pending data queue. Regulating the rate at which data is allowed to enter the high-utilization pending data queue may include throttling the issuance of write acknowledgements to a host that is providing the data to the high-utilization pending data queue so that the rate at which data is entering the high-utilization pending data queue is equal to the rate at which data is leaving the high-utilization pending data queue.

In another implementation, a computing system includes at least one processor and at least one memory architecture coupled with the at least one processor, wherein the computing system is configured to perform operations including determining a queue depth and a flush rate for each of a plurality of pending data queues associated with a cache system, thus defining a queue depth/flush rate pair for each of the plurality of pending data queues. A predicted drain time is determined for each of the plurality of pending data queues based, at least in part, upon the queue depth/flush rate pair, thus defining a plurality of predicted drain times that are respectively associated with the plurality of pending data queues.

One or more of the following features may be included. A storage array may include a plurality of volume groups and each of the plurality of pending data queues is associated with a respective volume group chosen from the plurality of volume groups. Each of the plurality of pending data queues may be configured to temporarily store data to be written to a respective volume group chosen from the plurality of volume groups. The plurality of predicted drain times may be compared to identify a high-utilization volume group, chosen from the plurality of volume groups, that is disproportionately utilizing the cache system. The rate at which data is allowed to enter a high-utilization pending data queue, included within the plurality of pending data queues and associated with the high-utilization volume group, may be regulated based, at least in part, upon the queue depth/flush rate pair defined for the high-utilization pending data queue. Regulating the rate at which data is allowed to enter the high-utilization pending data queue may include delaying the issuance of write acknowledgements to a host that is providing the data that is entering the high-utilization pending data queue. Regulating the rate at which data is allowed to enter the high-utilization pending data queue may include throttling the issuance of write acknowledgements to a host that is providing the data to the high-utilization pending data queue so that the rate at which data is entering the high-utilization pending data queue is equal to the rate at which data is leaving the high-utilization pending data queue.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
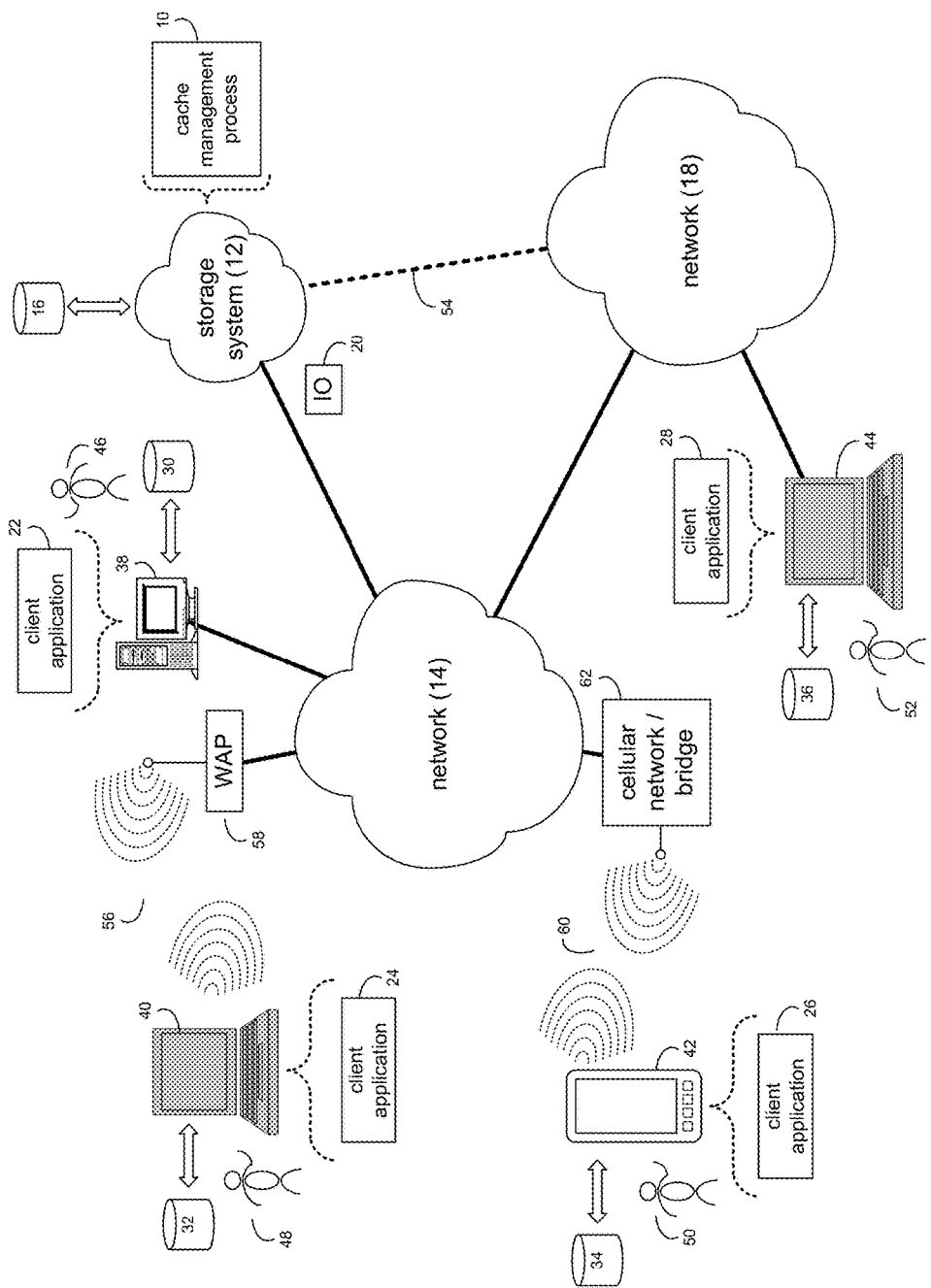
FIG. 1 is a diagrammatic view of a storage system and a cache management process coupled to a distributed computing network.

System Overview:

Referring to FIG. 1, there is shown cache management process 10 that may reside on and may be executed by storage system 12, which may be connected to network 14 (e.g., the Internet, a local area network, or a storage area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of cache management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a tablet computer (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
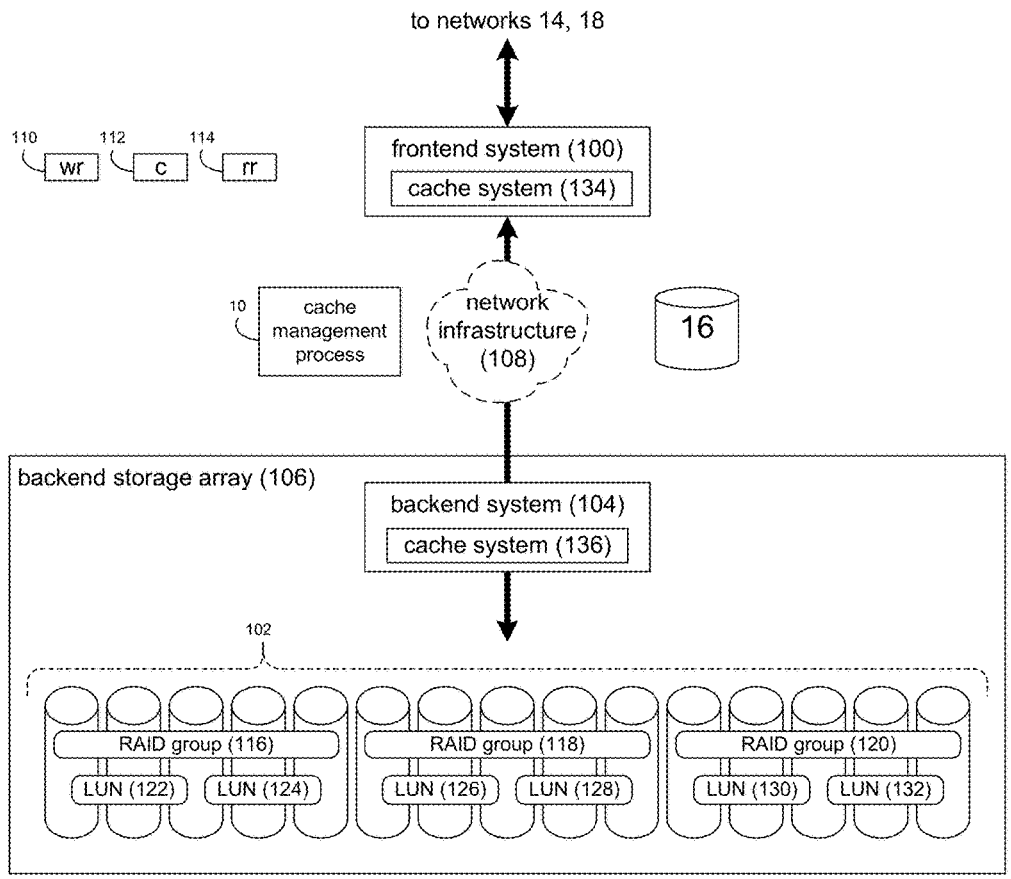
FIG. 2 is a diagrammatic view of the storage system of FIG. 1.

The Storage System:

Referring also to FIG. 2, storage system 12 may include one or more frontend systems (e.g., frontend system 100) and plurality of storage targets 102. Examples of front end system 100 may include but are not limited to a server computer or a storage processor available from EMC Corporation of Hopkinton, Mass. The quantity of storage targets 102 included within plurality of storage targets 102 may be increased or decreased depending upon e.g. the level of redundancy/performance/capacity required.

Plurality of storage targets 102 may be configured to provide various levels of performance and/or high availability. For example, a portion of plurality of storage targets 102 may be configured as a RAID 0 array, in which data is striped across storage targets. By striping data across a plurality of storage targets, improved performance may be realized. However, RAID 0 arrays do not provide a level of high availability. Accordingly, a portion of plurality of storage targets 102 may be configured as a RAID 1 array, in which data is mirrored between storage targets. By mirroring data between storage targets, a level of high availability is achieved as multiple copies of the data are stored within storage system 12.

While plurality of storage targets 102 is discussed above as being configured in a RAID 0 or RAID 1 array, this is for illustrative purposes only and is not intended to be a limitation of this disclosure, as other configurations are possible. For example, plurality of storage targets 102 may be configured as a RAID 3, RAID 4, RAID 5 or RAID 6 array.

Plurality of storage targets 102 may include one or more coded targets. As is known in the art, a coded target may be used to store coded data that may allow for the regeneration of data lost/corrupted on one or more of plurality of storage targets 102. An example of such a coded target may include but is not limited to a hard disk drive that is used to store parity data within a RAID array. The quantity of coded targets included within plurality of storage targets 102 may be increased or decreased depending upon e.g. the level of redundancy/performance/capacity required.

Examples of plurality of storage targets 102 may include one or more electro-mechanical hard disk drives and/or solid-state/flash devices, wherein the combination of plurality of storage targets 102 and processing/control systems (e.g., backend system 104) may form backend storage array 106.

The manner in which storage system 12 is implemented may vary depending upon e.g. the level of redundancy/ performance/capacity required. For example, storage system 12 may be a RAID device in which frontend system 100 is a RAID controller card and plurality of storage targets 102 are individual "hot-swappable" hard disk drives. An example of such a RAID device may include but is not limited to an NAS device. Alternatively, storage system 12 may be configured as a SAN, in which frontend system 100 may be e.g., a server computer or a storage processor and each of plurality of storage targets 102 may be a RAID device and/or computer-based hard disk drive. Further still, one or more of plurality of storage targets 102 may be a SAN.

In the event that storage system 12 is configured as a SAN, the various components of storage system 12 (e.g. frontend system 100, plurality of storage targets 102, and backend system 104) may be coupled using network infrastructure 108, examples of which may include but are not limited to an Ethernet (e.g., Layer 2 or Layer 3) network, a fiber channel network, an InfiniBand network, or any other circuit switched/packet switched network.

Storage system 12 may execute all or a portion of cache management process 10. The instruction sets and subroutines of cache management process 10, which may be stored on a storage device (e.g., storage device 16) coupled to frontend system 100 and/or backend system 104, may be executed by one or more processors (not shown) and one or more memory architectures (not shown) included within frontend system 100 and/or backend system 104. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when frontend system 100 is configured as (or coupled to) an application server, these IO requests may be internally generated within frontend system 100. Examples of IO request 20 may include but are not limited to data write request 110 (i.e. a request that content 112 be written to storage system 12) and data read request 114 (i.e. a request that content 112 be read from storage system 12).

During operation of storage system 12, content 112 to be written to storage system 12 may be processed by frontend system 100. Additionally/alternatively and when frontend system 100 is configured as (or coupled to) an application server, content 112 to be written to storage system 12 may be internally generated by frontend system 100.

The Cache Systems:

As discussed above, storage system 12 may include frontend system 100 and plurality of storage targets 102, wherein plurality of storage targets 102 may be configured to store data (e.g., content 112). In order to enable the storage of such data, backend storage array 106 may be configured to include a plurality of volume groups. Examples of such volume groups may include the above-described RAID groups (e.g., RAID groups 116, 118, 120), wherein each of these RAID groups (e.g., RAID groups 116, 118, 120) may include one or more LUNs (e.g., LUNs 122, 124 for RAID group 116, LUNs 126, 128 for RAID group 118, and LUNs 130, 132 for RAID group 120). As is known in the art, a LUN is a unit of logical storage that is defined within a storage system (e.g., storage system 12), wherein a LUN may span multiple physical storage devices (e.g., plurality of storage targets 102) while appearing to be a single storage device to a user.

Storage system 12 may include one or more cache system (e.g., cache systems 134 and/or cache system 136) that may be configured to enhance the performance of storage system 12. In this particular example, front end system 100 is shown to include cache system 134 and backend system 104 is shown to include cache system 136. During operation of storage system 12, data to be written to storage system 12 (e.g., content 112) may be temporarily stored on cache system 134 upon receipt of content 112 by frontend system 100, thus avoiding any delays associated with waiting for content 112 to be stored on backend system 104. Further, content 112 may be temporarily stored on cache system 136 upon receipt of content 112 by backend system 104, thus avoiding any delays associated with waiting for content 112 to be stored on plurality of storage targets 102. Further performance enhancements may be achieved when content to be read from storage system 12 is available in cache system 134 and/or cache system 136 (thus avoid the delays associated with retrieving the content to be read from backend system 104 and/or plurality of storage targets 102 (respectively).

Figure 3:
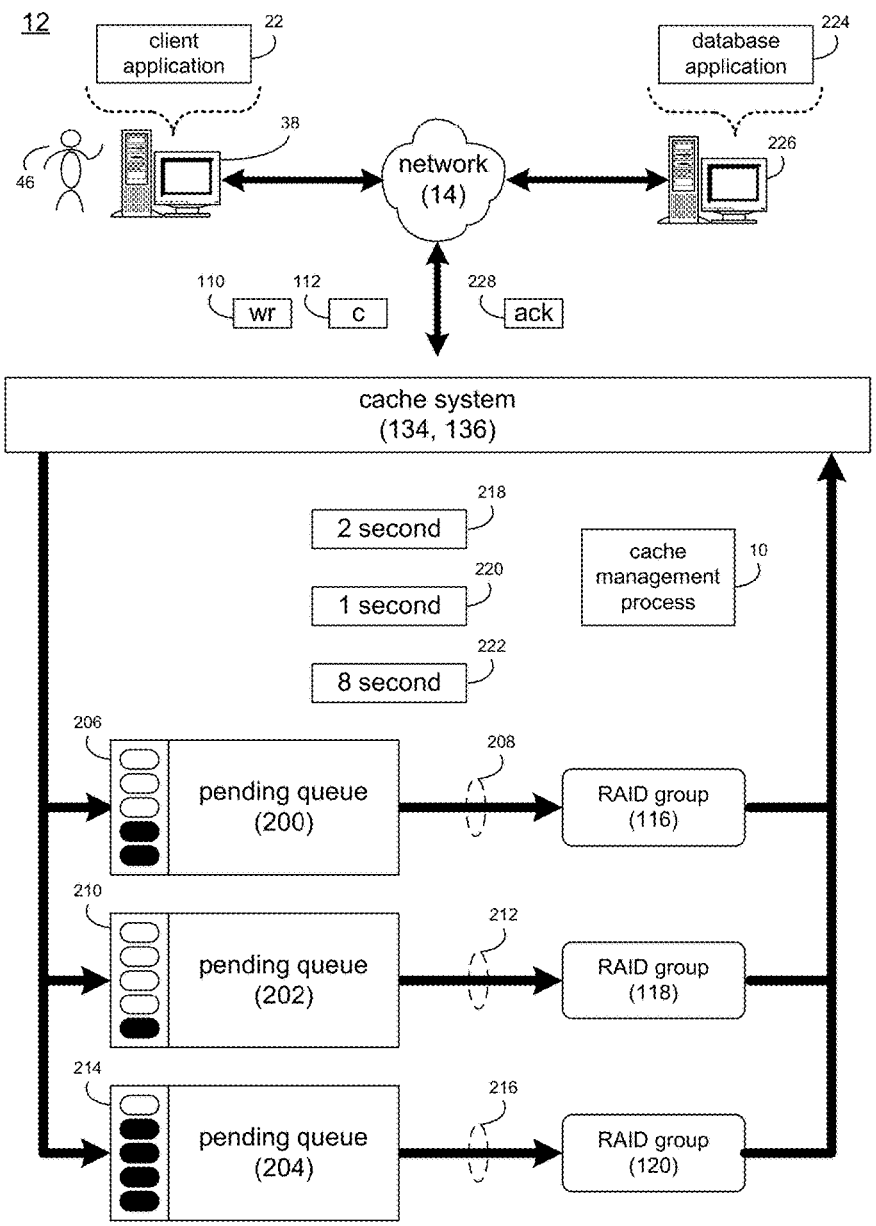
FIG. 3 is another diagrammatic view of the storage system of FIG. 1.

Referring also to FIG. 3 and as discussed above, storage system 12 may include one or more cache system (e.g., cache systems 134 (i.e., the front end cache system) and cache system 136 (i.e., the backend cache system) to enhance the performance of storage system 12, wherein cache systems 134, 136 may be managed by cache management process 10. For the following discussion, cache system 134 and cache system 136 will be discussed simultaneously and interchangeably. Accordingly, cache management system 10 may be configured to manage only cache system 134, only cache system 136, or both cache system 134 and cache system 136.

As discussed above, in order to enable the storage of data within storage system 12, backend storage array 106 may be configured to include a plurality of volume groups (e.g., RAID groups 116, 118, 120), wherein a pending data queue may be associated with each volume group. Accordingly, pending queue 200 may be associated with RAID group 116;

pending queue 202 may be associated with RAID group 118; and pending queue 204 may be associated with RAID group 120.

Each of the plurality of pending data queues (e.g., pending data queues 200, 202, 204) may be configured to temporarily store data to be written to their respective volume group. For example, when cache system 134, 136 receives content to be written to RAID group 116, such content may be temporarily stored within pending data queue 200 until RAID group 116 is available to receive and store the content. Further, when cache system 134, 136 receives content to be written to RAID group 118, such content may be temporarily stored within pending data queue 202 until RAID group 118 is available to receive and store the content. And when cache system 134, 136 receives content to be written to RAID group 120, such content may be temporarily stored within pending data queue 204 until RAID group 120 is available to receive and store the content.

During use and operation of storage system 12, the quantity of content stored within pending queues 200, 202, 204 may increase or decrease depending upon various factors. For example, if cache system 134, 136 is receiving a large quantity of content for one specific RAID group (e.g., RAID group 120), the pending queue (e.g., pending queue 204) associated with that RAID group (e.g., RAID group 120) may fill up with content awaiting storage. Additionally/alternatively, if a RAID group (e.g., RAID group 120) is a slower RAID group (e.g., one constructed of lower performance SATA drives), the pending queue (e.g., pending queue 204) associated with that RAID group (e.g., RAID group 120) may fill up with content awaiting storage. Unfortunately, as the pending queue associated with a RAID group fills up with content awaiting storage, that particular RAID group will utilize a higher-than-average portion of the storage space available within cache system 134, 136.

Specifically, assume that RAID group 120 is highly active and is having a very large quantity of data written to it. Further assume that RAID group 120 is a lower-performing RAID group. Accordingly, it is likely that pending queue 204 will begin to fill up with content awaiting storage on RAID group 120. As content for writing to RAID group 120 is received, such content is stored within cache system 134, 136. As this content is not yet written to the backend storage array 106 generally (and RAID group 120 specifically), this content stored within cache system 134, 136 is referred to as "dirty" data. As discussed above, the content to be written to RAID group 120 is placed within pending queue 204 and subsequently stored within RAID group 120. Once this content is stored within RAID group 120, this content may be reclassified as "clean" data and its cache storage space reused as needed by the cache system 134, 136. Unfortunately and in this example, since RAID group 120 is a lower performing RAID group that is receiving a large quantity of content, a larger than average portion of cache system 134, 136 will be utilized to stored content awaiting storage within RAID group 120.

Such an unequitable utilization of the storage space of cache system 134, 136 may adversely impact the performance of storage system 12. For example, if RAID group 116 and RAID group 118 are higher performing RAID groups (e.g., ones constructed of higher performing solid state storage devices), their respective pending queues (e.g., pending queues 200, 202) may be comparatively empty but, since RAID group 120 is over-utilizing the storage space available within cache system 134, 136, cache memory space may not be available for the content to be written to these RAID groups (e.g., RAID groups 116, 118) and, therefore, the performance of these RAID groups (e.g., RAID groups 116, 118) may be adversely impacted.

Accordingly, cache management system 10 may monitor the utilization of the memory of cache system 134, 136 and make adjustments to achieve equitable levels of cache utilization.

Figure 4:
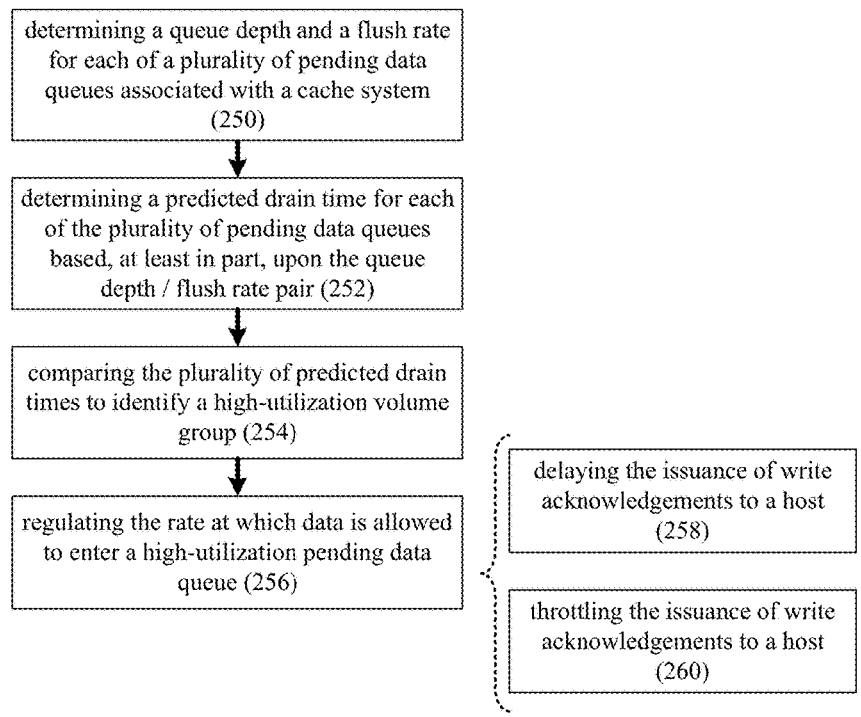
FIG. 4 is a flow chart of the cache management process of FIG. 1.

The Cache Management Process:

Referring also to FIG. 4, cache management process 10 may determine 250 a queue depth and a flush rate for each of a plurality of pending data queues (e.g., pending data queues 200, 202, 204) associated with a cache system (e.g., cache system 134, 136), thus defining a queue depth/flush rate pair for each of the plurality of pending data queues (e.g., pending data queues 200, 202, 204).

Continuing with the above-stated example, assume that cache management process 10 determines 250 that pending queue 200 (which is associated with RAID group 116) has a queue depth (e.g., queue depth 206) of twenty (i.e., twenty pieces of content are waiting to be written to RAID group 116) and a flush rate (e.g., flush rate 208) of ten per second (i.e., RAID group 116 is currently storing content at a rate of ten pieces of content per second). Further, assume that cache management process 10 determines 250 that pending queue 202 (which is associated with RAID group 118) has a queue depth (e.g., queue depth 210) of ten (i.e., ten pieces of content are waiting to be written to RAID group 118) and a flush rate (e.g., flush rate 212) of ten per second (i.e., RAID group 118 is currently storing content at a rate of ten pieces of content per second). Additionally, assume that cache management process 10 determines 250 that pending queue 204 (which is associated with RAID group 120) has a queue depth (e.g., queue depth 214) of forty (i.e., forty pieces of content are waiting to be written to RAID group 120) and a flush rate (e.g., flush rate 216) of five per second (i.e., RAID group 118 is currently storing content at a rate of five pieces of content per second).

Cache management process 10 may determine 252 a predicted drain time for each of the plurality of pending data queues (e.g., pending data queues 200, 202, 204) based, at least in part, upon their queue depth/flush rate pair (as discussed above), thus defining a plurality of predicted drain times that are respectively associated with the plurality of pending data queues (e.g., pending data queues 200, 202, 204).

Continuing with the above-stated example, since pending queue 200 (which is associated with RAID group 116) has a queue depth (e.g., queue depth 206) of twenty and a flush rate (e.g., flush rate 208) of ten per second, cache management process 10 may determine 252 that pending data queue 200 has a predicted drain time (e.g., predicted drain time 218) of two seconds (i.e., 20/10 per second). Further, since pending queue 202 (which is associated with RAID group 118) has a queue depth (e.g., queue depth 210) of ten and a flush rate (e.g., flush rate 212) of ten per second, cache management process 10 may determine 252 that pending data queue 202 has a predicted drain time (e.g., predicted drain time 220) of one second (i.e., 10/10 per second). Additionally, since pending queue 204 (which is associated with RAID group 120) has a queue depth (e.g., queue depth 214) of forty and a flush rate (e.g., flush rate 216) of five per second, cache management process 10 may determine 252 that pending data queue 204 has a predicted drain time (e.g., predicted drain time 222) of eight seconds (i.e., 40/5 per second).

Cache management process 10 may compare 254 the plurality of predicted drain times (e.g., predicted drain time 218, 220, 222) to identify a high-utilization volume group (e.g., RAID group 120), chosen from the plurality of volume groups (e.g., RAID groups 116, 118, 120), that is disproportionately utilizing the cache system (e.g., cache system 134, 136). In this particular example, RAID group 120 has a predicted drain time that is 4-8 times great than the other RAID groups (e.g., RAID groups 116, 118) and, thus, disproportionally utilizing cache system 134, 136.

Cache management process 10 may regulate 256 the rate at which data is allowed to enter the high-utilization pending data queue (e.g., pending data queue 204), which is included within the plurality of pending data queues (e.g., pending data queues 200, 202, 204) and associated with the high-utilization volume group (e.g., RAID group 120), based, at least in part, upon the queue depth/flush rate pair defined for the high-utilization pending data queue (e.g., pending data queue 204). As discussed above, pending queue 204 has a queue depth (e.g., queue depth 214) of forty, a flush rate (e.g., flush rate 216) of five per second, and a predicted drain time (e.g., predicted drain time 222) of eight seconds.

When regulating 256 the rate at which data is allowed to enter the high-utilization pending data queue (e.g., pending data queue 204), cache management process 10 may delay 258 the issuance of write acknowledgements to the host (e.g., a client application or an application server) that is providing the data that is entering the high-utilization pending data queue (e.g., pending data queue 204). For example, assume that user 46 is using client application 22 on personal computer 38 to access database application 224 executed on application server 226 that is coupled to network 14. As user 46 make various charges utilizing database application 224, content (e.g., content 112) and write requests (e.g., write request 110) may be generated and provided to cache system 134, 136 so that the content may be stored within RAID group 120 (e.g., the RAID group to which user 46 and/or database application 226 are assigned).

Accordingly and continuing with the above-stated example, in order to better balance the utilization of cache system 134, 136 amongst all of the RAID groups (e.g., (e.g., RAID groups 116, 118, 120), cache management process 10 may delay 258 the issuance of write acknowledgements (e.g., write acknowledgement 228) to server computer 226, which is the host generating the write requests (e.g., write request 110) and providing the data (e.g., content 112) that is entering pending data queue 204.

Specifically, when a write request (e.g., write request 110) in generated and content 112 is provided, write request 110 is typically acknowledged when content 112 has been stored within the cache system (e.g., cache system 134, 136) and, therefore, is not delayed until content 112 is written to e.g., backend storage array 106. However and when a RAID group (e.g., RAID group 120) is utilizing too much of e.g., cache system 134, 136 (as determined in the manner described above), cache management process 10 may delay 258 the issuance of these write acknowledgements to server computer 226, thus slowing down the rate at which additional write requests may be generated and also the rate at which data may enter e.g., pending queue 204, thus allowing pending queue 204 to empty and RAID group 120 to utilize a more equitable (i.e., smaller) portion of cache system 134, 136.

As a further example, when regulating 256 the rate at which data is allowed to enter the high-utilization pending data queue (e.g., pending data queue 204), cache management process 10 may throttle 260 the issuance of write acknowledgements (e.g., write acknowledgement 228) to the host (e.g., server computer 226) that is providing the data (e.g., content 112) to the high-utilization pending data queue (e.g., pending data queue 204) so that the rate at which data is entering the high-utilization pending data queue (e.g., pending data queue 204) is equal to the rate at which data is leaving the high-utilization pending data queue (e.g., pending data queue 204).

For example, cache manage process 10 may throttle 260 the issuance of write acknowledgements (e.g., write acknowledgement 228) to server computer 226 (which is providing content 112 to pending data queue 204) so that e.g., if sixteen blocks of data where written to RAID group 120 (resulting in cache system 134, 136 flushing sixteen blocks of data from cache memory system 134, 136), cache management process 10 may only then provide write acknowledgements concerning sixteen blocks of data, thus limiting the rate at which data may enter pending queue 204 to no more than the rate at which data is leaving pending queue 204 (and is written to RAID group 120).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

determining a queue depth and a flush rate for each of a plurality of pending data queues associated with a cache system of a backend system, thus defining a queue depth/flush rate pair for each of the plurality of pending data queues, wherein each of the plurality of pending data queues is associated with, and configured to temporarily store all data to be written to, a respective volume group chosen from the plurality of volume groups, thus defining a plurality of pending data queue volume group pairs, and wherein the queue depth is based upon, at least in part, an amount of data temporarily stored within the respective pending data queue of each pending data queue volume group pair and the flush rate is based upon, at least in part, the rate at which the data is written to the respective volume group of each pending data queue volume group pair;

determining a predicted drain time for each of the plurality of pending data queues based, at least in part, upon the queue depth/flush rate pair, thus defining a plurality of predicted drain times that are respectively associated with the plurality of pending data queue volume group pairs;

comparing the plurality of predicted drain times to one another to identify a high-utilization volume group, chosen from the plurality of volume groups, wherein the high-utilization volume group utilizes a higher-than-average portion of the cache system based upon, at least in part, the predicted drain times for each of the plurality of pending data queues; and regulating the rate at which data is allowed to enter a high-utilization pending data queue based, at least in part, upon the queue depth/flush rate pair defined for the high-utilization pending data queue including delaying the issuance of write acknowledgements for write requests associated with data entering the high-utilization pending data queue and not delaying the issuance of write acknowledgements for write requests associated with data entering a non-high-utilization pending data queue.

2. The computer implemented method of claim 1 wherein regulating the rate at which data is allowed to enter the high-utilization pending data queue includes:

throttling the issuance of write acknowledgements to a host that is providing the data to the high-utilization pending data queue so that the rate at which data is entering the high-utilization pending data queue is equal to the rate at which data is leaving the high-utilization pending data queue.

3. A computer program product residing on a non-transitory computer readable medium having a plurality of instructions stored thereon which, when executed by a processor, cause the processor to perform operations comprising:

determining a queue depth and a flush rate for each of a plurality of pending data queues associated with a cache system of a backend system, thus defining a queue depth/flush rate pair for each of the plurality of pending data queues, wherein each of the plurality of pending data queues is associated with, and configured to temporarily store all data to be written to, a respective volume group chosen from the plurality of volume groups, thus defining a plurality of pending data queue volume group pairs, and wherein the queue depth is based upon, at least in part, an amount of data temporarily stored within the respective pending data queue of each pending data queue volume group pair and the flush rate is based upon, at least in part, the rate at which the data is written to the respective volume group of each pending data queue volume group pair;

determining a predicted drain time for each of the plurality of pending data queues based, at least in part, upon the queue depth/flush rate pair, thus defining a plurality of predicted drain times that are respectively associated with the plurality of pending data queue volume group pairs;

comparing the plurality of predicted drain times to one another to identify a high-utilization volume group, chosen from the plurality of volume groups, wherein the high-utilization volume group utilizes a higher-than-average portion of the cache system based upon, at least in part, the predicted drain times for each of the plurality of pending data queues; and regulating the rate at which data is allowed to enter a high-utilization pending data queue based, at least in part, upon the queue depth/flush rate pair defined for the high-utilization pending data queue including delaying the issuance of write acknowledgements for write requests associated with data entering the high-utilization pending data queue and not delaying the issuance of write acknowledgements for write requests associated with data entering a non-high-utilization pending data queue.

4. The computer program product of claim 3 wherein regulating the rate at which data is allowed to enter the high-utilization pending data queue includes:

throttling the issuance of write acknowledgements to a host that is providing the data to the high-utilization pending data queue so that the rate at which data is entering the high-utilization pending data queue is equal to the rate at which data is leaving the high-utilization pending data queue.

5. A computing system including a processor and memory configured to perform operations comprising:

determining a queue depth and a flush rate for each of a plurality of pending data queues associated with a cache system of a backend system, thus defining a queue depth/flush rate pair for each of the plurality of pending data queues, wherein each of the plurality of pending data queues is associated with, and configured to temporarily store all data to be written to, a respective volume group chosen from the plurality of volume groups, thus defining a plurality of pending data queue volume group pairs, and wherein the queue depth is based upon, at least in part, an amount of data temporarily stored within the respective pending data queue of each pending data queue volume group pair and the flush rate is based upon, at least in part, the rate at which the data is written to the respective volume group of each pending data queue volume group pair;

determining a predicted drain time for each of the plurality of pending data queues based, at least in part, upon the queue depth/flush rate pair, thus defining a plurality of predicted drain times that are respectively associated with the plurality of pending data queue volume group pairs;

comparing the plurality of predicted drain times to one another to identify a high-utilization volume group, chosen from the plurality of volume groups, wherein the high-utilization volume group utilizes a higher-than-average portion of the cache system based upon, at least in part, the predicted drain times for each of the plurality of pending data queues; and regulating the rate at which data is allowed to enter a high-utilization pending data queue based, at least in part, upon the queue depth/flush rate pair defined for the high-utilization pending data queue including delaying the issuance of write acknowledgements for write requests associated with data entering the high-utilization pending data queue and not delaying the issuance of write acknowledgements for write requests associated with data entering a non-high-utilization pending data queue.

6. The computing system of claim 5 wherein regulating the rate at which data is allowed to enter the high-utilization pending data queue includes:

throttling the issuance of write acknowledgements to a host that is providing the data to the high-utilization pending data queue so that the rate at which data is entering the high-utilization pending data queue is equal to the rate at which data is leaving the high-utilization pending data queue.

* * * * *